United States Patent [19]

Tsukahara et al.

[11] Patent Number: 4,735,275
[45] Date of Patent: Apr. 5, 1988

[54] BODY FRAME FOR VEHICLES

[75] Inventors: Takeshi Tsukahara, Kawagoe; Tsutomu Takeuchi, Asaka; Kikuo Murase, Tokyo, all of Japan

[73] Assignee: Honda Giken Kogyo Kabushiki Kaisha, Tokyo, Japan

[21] Appl. No.: 916,232

[22] Filed: Oct. 7, 1986

[30] Foreign Application Priority Data

Oct. 7, 1985 [JP] Japan ................... 60-224463

[51] Int. Cl.$^4$ ............................................. B62D 61/08
[52] U.S. Cl. .................................. 180/215; 180/312; 280/282
[58] Field of Search ............... 180/210, 215, 219, 311, 180/312, 218; 280/281 R, 282, 781

[56] References Cited

U.S. PATENT DOCUMENTS

| 2,633,203 | 3/1953 | Paton | 280/795 X |
|---|---|---|---|
| 4,478,305 | 10/1984 | Martin, II | 180/215 |
| 4,535,869 | 8/1985 | Tsutsumikoshi et al. | 180/311 |
| 4,573,550 | 3/1986 | Inomata et al. | 180/215 X |
| 4,614,249 | 9/1986 | Yamanaka | 180/312 |
| 4,650,210 | 3/1987 | Hirose et al. | 180/215 X |

Primary Examiner—John J. Love
Assistant Examiner—Charles R. Watts
Attorney, Agent, or Firm—Bucknam and Archer

[57] ABSTRACT

A vehicle which may be three-wheeled or four-wheeled, for instance, a buggy comprises a front wheel and a wishbone suspension for supporting the front wheel and a power unit. The body frame comprises a left subframe, a right subframe of essentially quadrilateral configuration, each subframe having an upper side, a front side, a lower side and a rear side. A reinforcing bar connects the front side and the lower side. The subframes form a first loop. The reinforcing bar forms a second loop with the upper side, the rear side, the front side and the lower side. The second loop is within the first loop. The first loop supports the front wheel wishbone suspension and the second loop supports the power unit. The front side has an upper portion and a lower portion and the lower side has a forward portion and a rear portion and the second loop is formed by the upper side, the upper portion of the front side, the rear portion of the lower side and the rear side. A down bar connects the upper bar to the lower side and intersects the reinforcing bar at a point P. The wishbone suspension is supported by the reinforcing bar and the lower side forwardly of point P and the power unit is supported rearwardly of the point P by the reinforcing bar and the lower side.

9 Claims, 5 Drawing Sheets

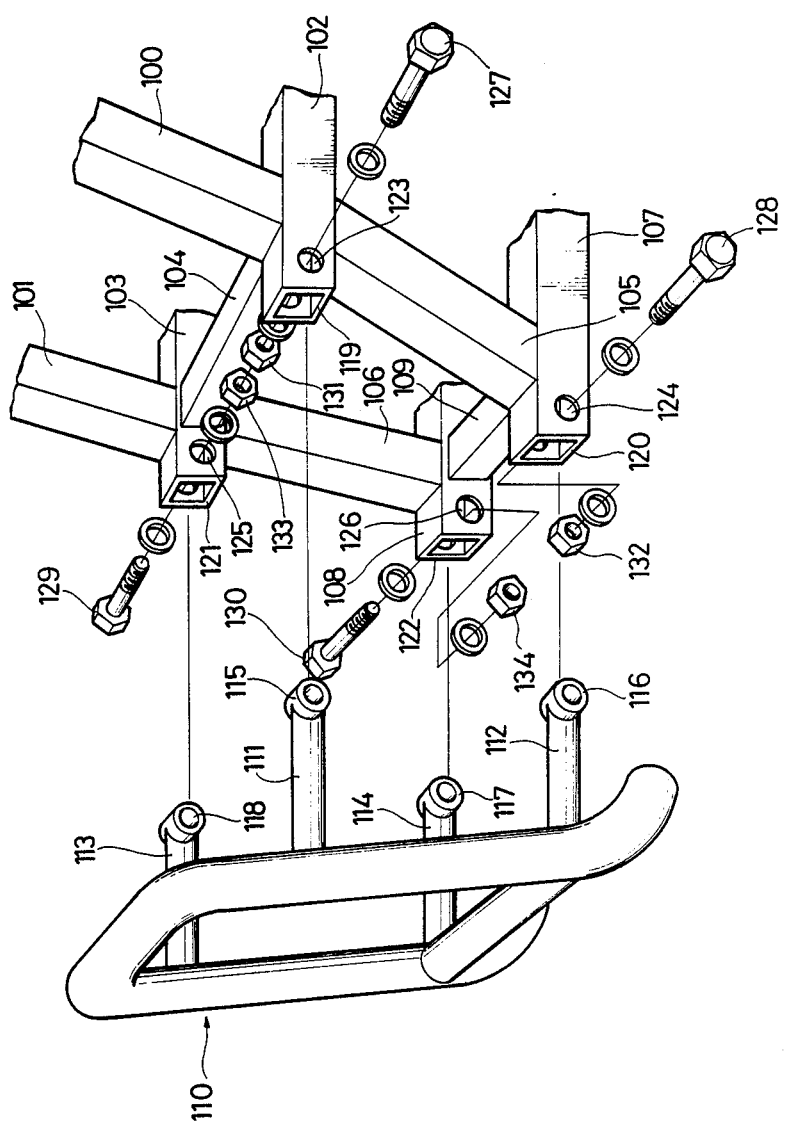

BODY FRAME FOR VEHICLES

The present invention relates to body frames for vehicles and more specifically for three wheeled or four wheeled buggies, i.e., ride-on type vehicles which conventionally have three or four low-pressured tires called balloon tires, which buggies are mainly used on rough roads like muddy or sand roads.

Four-wheeled buggies which have in front a frame of the wish-bone type suspension, in which it is necessary to provide a pair of the wish-bone arms on each side at the front end of the body frame, are known. This type of frame requires additional strength. The body frame usually has a front frame which supports the front suspension, a power unit, and a rear frame for mounting the seat. The frame forms an essentially quadrilateral loop and includes a pipe arranged horizontally and two pipes between the upper portion and the bottom portion of the frame. A single loop construction is provided to support the suspension and the power unit. A drawback of the known buggies is that it is necessary to use two pipes to achieve the required strength and this causes an increase in weight.

There has been a need in the art for an increase in strength and simultaneously low weight of the frame, that is opposite objects. This result would be particularly desirable in the case of sport buggies.

An object of the present invention is to provide a body frame which has sufficient strength and at the same time light weight.

Another object is to provide a frame which may be easily and economically assembled.

Still another object of the present invention is to provide a frame which comprises a reinforcing member and a down member which intersect, in which the wishbone suspension is supported forwardly of the intersection point and the power unit is supported rearwardly of the intersection point.

The crux of the present invention resides in providing a frame which has a left and a right subframe of quadrilateral shape which form a first loop, with a reinforcing member connecting the front side and the lower side of the subframes and which form a second loop within the first loop. The first loop supports the front wheel suspension and the second loop supports the power unit.

The invention will be further illustrated by reference to the accompanying drawings of which:

FIG. 6 illustrates the front part of still another embodiment of a body frame according to the present invention.

Figure 1:
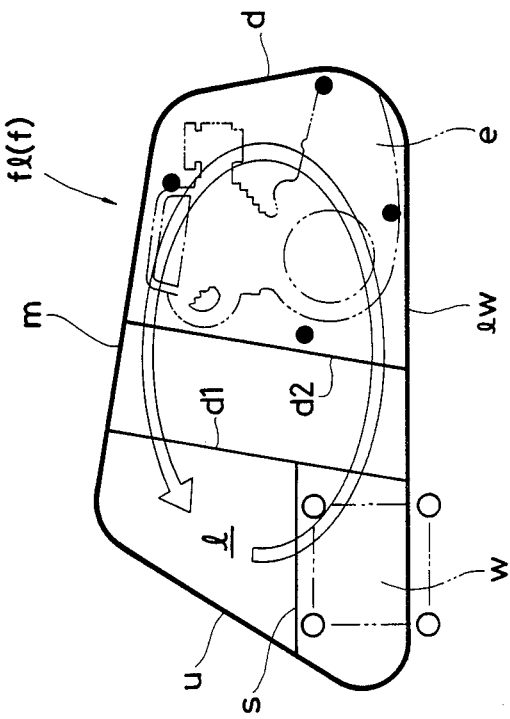
FIG. 1 illustrates schematically a side view of a known front frame.

FIG. 1 shows the outline of a front frame known in the art including the supporting portions of a front suspension and a power unit. The front frame f has a pair of right and left sub-frames, which are connected by cross-members to each other. The sub-frame fl is made with pipes and forms an essentially quadrilateral loop. In the side view it comprises a main pipe m which is the top side, an upper pipe u which is the front side, a lower pipe lw which is the bottom side and a down pipe d which is the rear side. A pair of pipes $d_1$ and $d_2$ is provided between the main pipe m and the lower pipe lw, and an horizontal reinforcing pipe S is also provided. Pipe S is arranged between the upper pipe u and the down pipe $d_1$ and is parallel to the lower pipe lw. The wishbone type suspension W is shown schematically by dotted lines in which the wishbone arm is mounted at both front ends of the reinforcing pipe S and the lower pipe lw. This type of suspension usually includes a cushion and a low-pressured tire. There is mounted a power unit e which includes an engine within the space surrounded by the down pipe $d_2$, the main pipe m, the rear downpipe d and the lower pipe lw. In this type of body frame, the suspension and the power unit E are supported only by a single loop frame construction and a pair of down pipes is necessary in order to obtain the required strength so that the total weight of the frame is increased. However, since buggies are usually used under rough conditions, it would be desirable to achieve simultaneously the opposite objects, i.e., strength and light weight.

Figure 2:
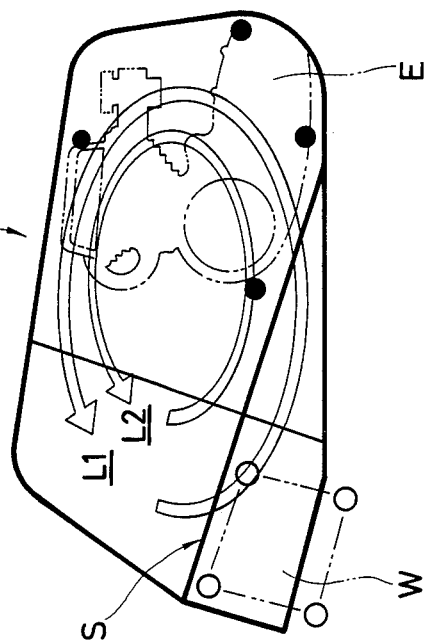
FIG. 2 illustrates schematically a side view of one embodiment of a body frame according to the present invention.

The invention will now be described by reference to the FIGS. 2-6. FIG. 2 shows the left front sub-frame Fl together with the front suspension W and the power unit E which includes an engine. The sub-frame Fl of quadrilateral shape in side view constitutes a first loop construction $L_1$. A sub-member S connects the front side and the lower side of the left front sub-frame Fl and a second loop construction $L_2$ is formed within the first loop construction $L_1$. In this manner, the first loop construction $L_1$ mainly supports the front wheel suspension W and the second loop construction $L_2$ mainly supports the power unit E. In this manner, frame F can easily be made by connecting the right and left sub-frames with cross-members.

It is clear from the foregoing that the present invention presents the advantage that the first loop construction $L_1$ and the second loop construction $L_2$ support the front wheel suspension W and the power unit E respectively so that the body frame can achieve simultaneously both the opposite objects, sufficient strength and at the same time light weight. Additionally, the downpipes conventionally used may be omitted for the purpose of obtaining a structure of light weight.

Figure 3:
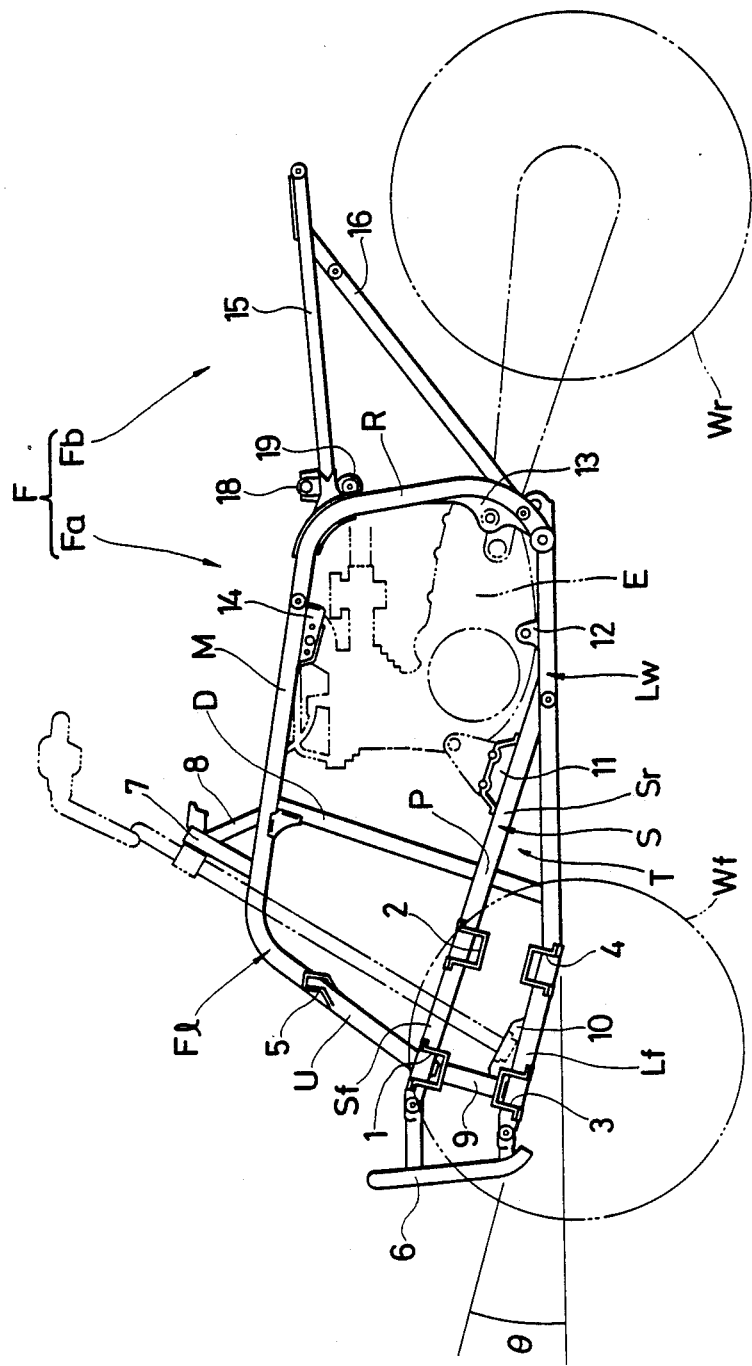
FIG. 3 illustrates a side view of another embodiment of a body frame according to the present invention, applied to a four-wheel buggy.
Figure 4:
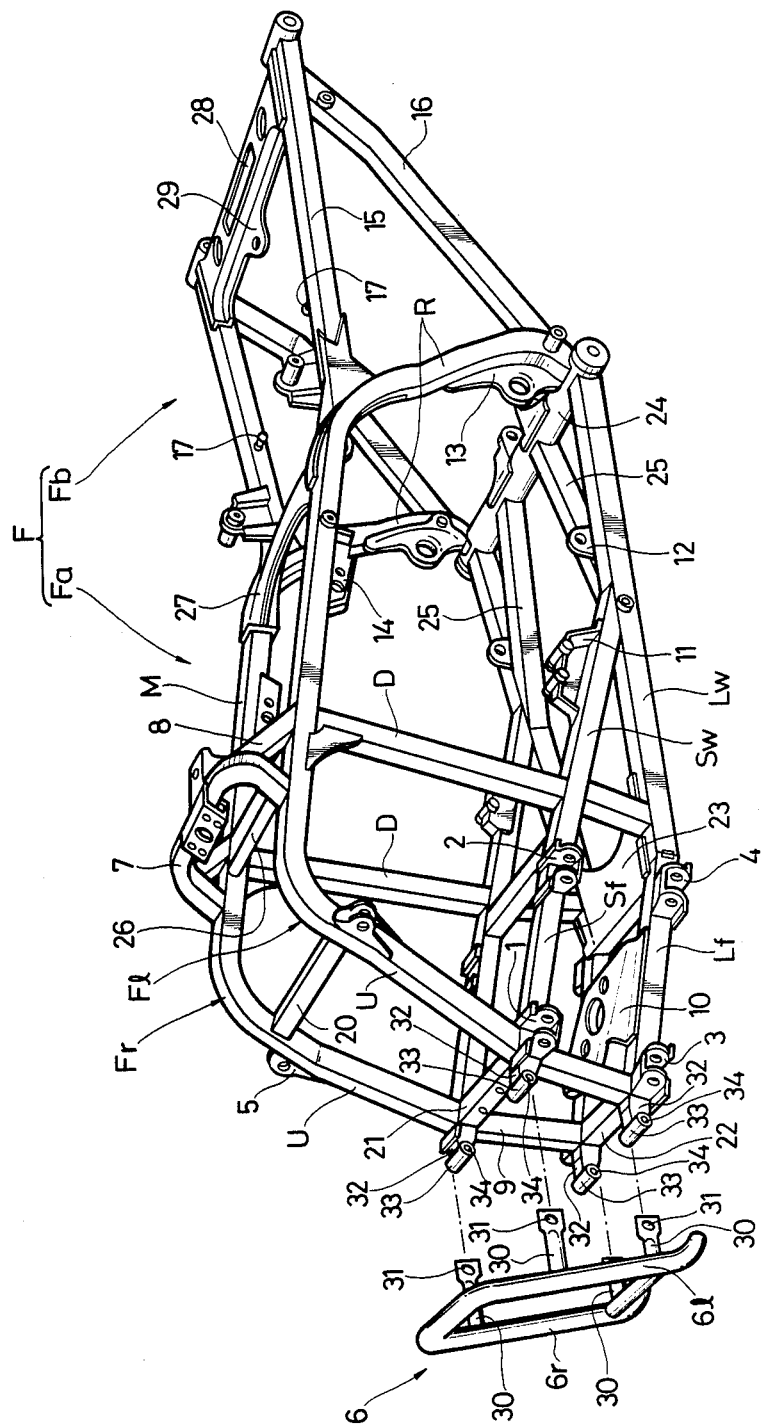
FIG. 4 illustrates a full construction of the body frame of FIG. 3.
Figure 5:
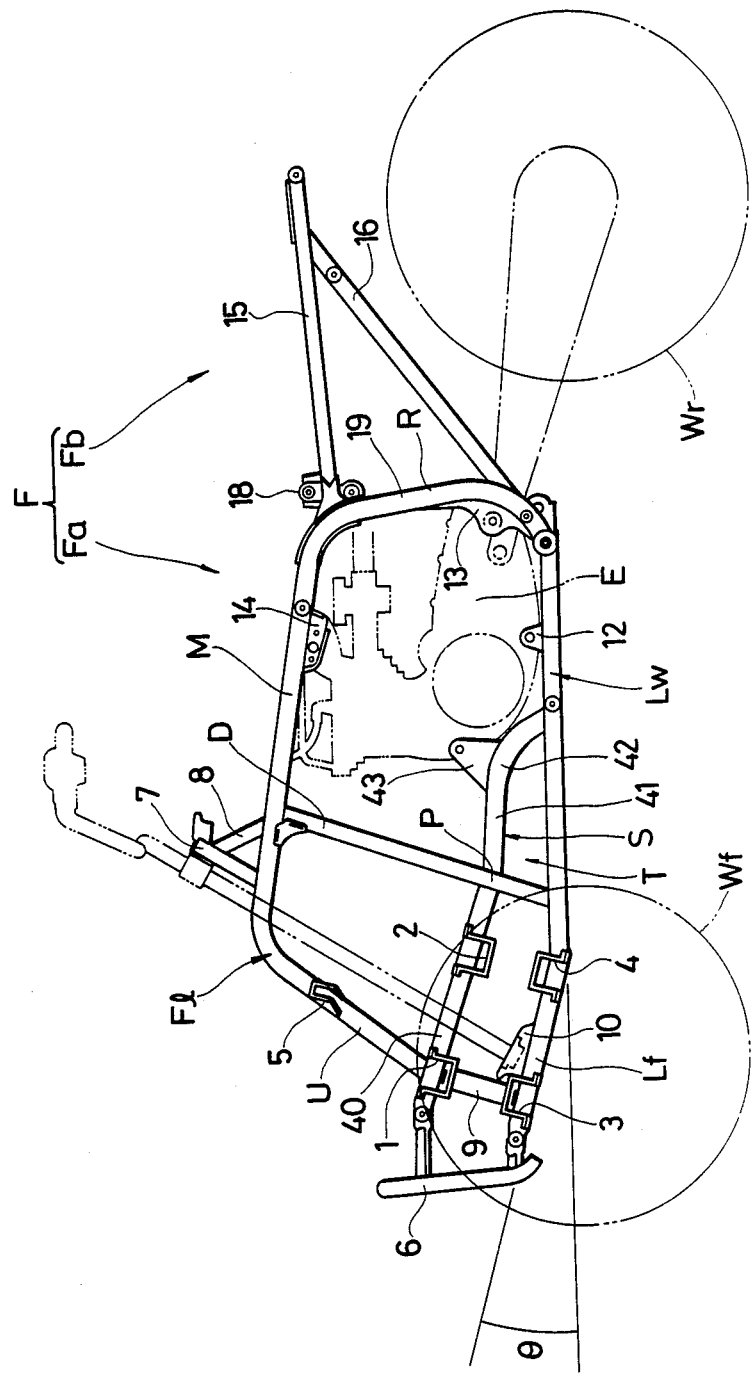
FIG. 5 illustrates a side view of another embodiment of a body frame according to the present invention.

FIGS. 3-5 illustrate preferred embodiments of the invention in which the invention is applied to a four wheeled buggy. FIG. 3 shows a body frame F which has a front frame Fa in which a front suspension and a power unit are mounted, and a rear frame Fb on which a seat is mounted. The front frame Fa has right and left sub-frames of quadrilateral shape in side view each of which is constructed by four sides of a main upper pipe M, front side U, lower pipe Lw at the bottom and down pipe R in the rear. These four side members may form the sub-frame by welding pipes or by bending a single pipe. Additionally, a reinforcing down pipe D is disposed between the main pipe M and the lower pipe Lw and a reinforcing sub-pipe S connects the upper pipe U and the lower pipe Lw. This pipe S crosses the down pipe at point P. The sub-pipe S provides the second loop construction $L_2$ by means of the combination of the main pipe M, the upper half of the upper pipe U, the rear portion of the lower pipe Lw and the down pipe R. On the front portion Sf of the sub-pipe S from the crossing point P and the forward portion Lf of the lower pipe Lw, which is parallel to the forward portion Sf and which is upwardly and forwardly inclined with an angle of θ degree, there are fixed four brackets 1,2,3,4, which are adapted to support the wishbone suspension. This suspension is formed by the upper arm, not shown in the drawing, which is bolted on the brackets 1,2, in the upper side and by the lower arm (not shown in the drawing) which is bolted on the brackets 3, 4 in the lower side. Bracket 5 on the upper pipe U is used for resting a cushion (not shown in the drawing) in the wishbone suspension including a low-pressure balloon tire. A front bumper 6 is secured at the front ends of the sub-pipe Sf and the lower pipe Lf.

A supporting pipe 7 for a steering head pipe and a reinforcing pipe 8 are positioned at the front portion of the main pipe M. The lower portion 9 of the upper pipe U is divided from the upper portion and the lower portion is welded to the front end of the sub-pipe Sf. The lower end 9 of the upper pipe lower portion is also welded to the lower pipe front portion Lf and a bracket 10 for supporting the lower end of the steering shaft is secured on the lower pipe front portion.

There are provided bracket 11 on the rear portion of the sub-pipe Sr from the crossing point P, a bracket 12 on the rear portion of the lower pipe Lw, a bracket 13 on the downpipe R and a bracket 14 on the main pipe M so that they support the power unit E, for instance, an engine. Namely, the first loop construction $L_1$ and the second loop construction $L_2$ support respectively the front wheel suspension and the power unit E. The lower portion of the down pipe D from the crossing point P, the rear portion of the lower pipe Lw and the rear sub-pipe S form a triangular frame T which improves the strength of the body frame.

The rear frame Fb has a seat rail 15 which extends rearwardly from the upper end of the downpipe R and is used to mount a seat (not shown in the drawing) thereon. The rear frame also comprises a reinforcing back stay 16 which extends rearwardly and is upwardly inclined from the lower end of the down pipe R and is welded to the rear portion of the seat rail 15. A pair of seat fitting brackets 18 and a rear cushion bolting bracket 19 are welded on the front end of the seat rail 15. The rear wheel W r is positioned on the rear swing arm extending rearwardly from the downpipe R end.

FIG. 4 shows the full body construction. The front frame Fa has a left sub-frame Fl and a right sub-frame Fr in which the sub-frames Fl and Fr have the same form, which is a symmetrical form in side view. The following description will be made with the sare reference numbers used in the left sub-frame Fl. The right and left sub-frames are connected by means of three independent cross-members 20,21,22, cross plate 23, three other independent cross-members 24,26,27 and cross-plate 28. The cross-member 24 and each of the right and left lower pipes are respectively connected by reinforcing pipes 25,25. There is provided a pair of seat fitting brackets 17, 17, each of which projects respectively from the interior of the seat rail 15 towards the center of the frame.

A front bumper 6 is detachably secured at the front ends of the right and left sub-frame Fr, Fl. Further cross-member 20 may also serve as a front bumper. The front bumper 6 is formed in nearly quadrilateral shape and four fitting legs extend rearwardly therefrom, that is pairs of upper and lower fitting legs 30,30 have a pressed vertical plain surface at the rear end respectively and an orifice 31 for insertion of a bolt. Pipes 33 with their corresponding openings 34 for engaging with the bolts are secured at the front end 32 of each of the sub-pipe U and the lower pipe Lf. The orifice 31 thus overlaps the opening 34 so that the fitting legs 30 are fixed on each of the sub-frame S and the lower pipe Lf with bolts (not shown in the drawing).

Both right side 6r and left side 6l of the bumper 6 are bolted respectively on the sub-pipes S and the lower pipes Lf. Since the pipe 33 is welded at the front end of the body frame, the bumper 6 may be easily assembled. A pipe with a welded nut may be used instead of the screwed pipe 33.

According to the present invention, the sub-pipe S is a single pipe, and the divided upper pipe U and the divided down pipe D are welded to it so that the sub-pipe S can support both the front suspension W and the power unit E.

FIG. 5 shows a second preferred embodiment of the present invention which is a modification obtained by partially changing the configuration of the sub-pipe S of the embodiment of FIGS. 3 and 4. Therefore, the corresponding members or portions are denoted by the same reference numerals or symbols. In this embodiment the sub-pipe S is divided into two portions, that is, a front pipe 40 and a rear pipe 41. The front pipe is straight and its forward and rearward end are welded respectively to the upper pipe U and to the down pipe D. However, the rear position 41 has a curved portion 42 and its front end is connected to the downpipe D by welding at a point where the rear end of the front pipe 40 is connected. The rear end of the sub-pipe S is welded to the upper surface of the lower pipe Lw. Bracket 43 projects upwardly from the curved portion 42 for mounting the power unit E and for reducing the distance between the power unit E and the rear pipe 41. In this manner, it is not necessary to make the bracket very rigid and of large size. According to this embodiment with rear pipe 41, the best position for mounting the engine may be obtained with an extremely small bracket only by bending suitably the pipe 41 in conformance with the power unit E.

FIG. 6 shows another embodiment of a front bumper assembly. The front bumper 110 is positioned at the front end of the frame F which is the same as described hereinabove. The front bumper 110 has four legs which are the same as in the previous embodiment, that is, an upper fitting leg 111 and a lower fitting leg 112 extending rearwardly from the left side of the bumper 110, an upper fitting leg 113 and a lower fitting leg 114 extending rearwardly from the right side of the bumper 110. It also comprises pipe collars 115,116,117,118, which are welded respectively on each end of the legs 111,112,113,114. These legs 111,112,113,114 may be inserted into the openings 119,120,121,122 of the sub-pipes 102,103 and the lower pipes 107,108. There are also provided openings 123,124 on the right and left sub-frame and on the lower pipe ends 125,126 for inserting respectively bolts 127, 128,129,130 therethrough in order to secure the bumper 110 and bolts 127,128,129,130 by means of nuts 131,132,133 and and 134. In this manner, the front bumper may be easily secured to the front portion of the frame. With this embodiment it is not necessary to manufacture the bumper prior to the manufacture of the frame.

When the inner diameter of the fitting legs is larger than the outside diameter of the frame front end, the fitting may be achieved in the reversed manner. Further, if the frame extends forwardly more than in the above embodiment, the fitting legs of the front bumper could be made smaller or could be a simple bracket.

What is claimed is:

1. In a vehicle which has two rear wheels and at least one front wheel, a power unit and a wishbone suspension for supporting said at least one front wheel, a body frame which comprises a left subframe and a right subframe, each subframe of essentially quadrilateral configuration, said left subframe and said right subframe being connected to each other, each said subframe having an upper member, a front member, a lower member and a rear member, said subframes forming a first loop, a reinforcing member connecting said front member and said lower member, a down member connecting said upper member and said lower member, said down member intersecting said reinforcing member, wherein said front member has an upper portion and a lower portion and said lower member has a forward portion and a rear portion and a second loop is formed by the upper member, the upper portion of the front member, the reinforcing member, the rear portion of the lower member and said rear member, said second loop being within said first loop, said first loop supporting said front wheel wishbone suspension, said second loop supporting said power unit.

2. The body frame according to claim 1 wherein said down member connects said upper member to said lower member and intersects said reinforcing member at a point P, said wishbone suspension is supported by said reinforcing member and said lower member forwardly of said point P and the power unit is supported rearwardly of said point P by said reinforcing member and said lower member.

3. The body frame according to claim 1 wherein said reinforcing member is made of a single member.

4. The body frame according to claim 2 wherein said reinforcing member is made of two portions joined at said point P.

5. The body according to claim 4 wherein said reinforcing member is made of a forward portion and a rear portion, the forward portion is straight and the rear portion is curved.

6. The body frame according to claim 5 wherein a bracket for supporting the power unit is provided on the curved portion of said reinforcing member.

7. The body frame according to claim 2 wherein said reinforcing member is joined with said lower member at a first intersection point and said down member is joined with said lower member at a second intersection point, said reinforcing member has brackets between said first and second intersection points, said brackets support said power unit, said lower member has a forward portion and a rear portion joined at said second intersection point, said forward portion has second brackets, said reinforcing member has third brackets in the forward portion thereof and said second and third brackets support said wishbone suspension.

8. The body frame according to claim 6 wherein said forward portion of said reinforcing member and said forward portion of said lower member are parallel.

9. The body frame according to claim 1 which comprises a front bumper, said lower member and said front member join at a third intersection point, said reinforcing member joins with said front member at a fourth intersection point, said reinforcing member and said lower member have projections forwardly of said third and fourth intersection points and said front bumper is fixed on said projections.

* * * * *